A. H. CANDEE.
CONTROL SYSTEM.
APPLICATION FILED AUG. 3, 1917.
1,354,167.
Patented Sept. 28, 1920.
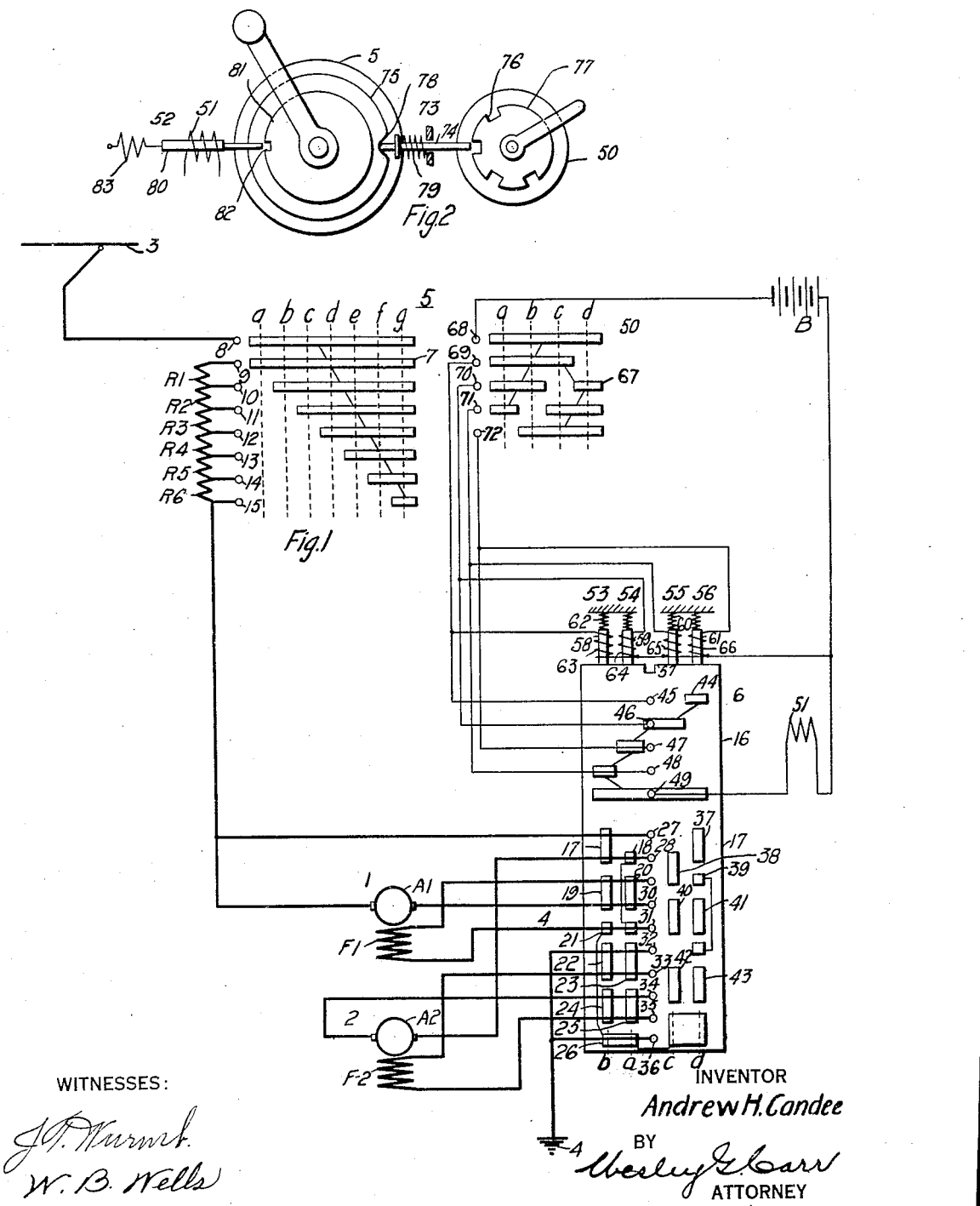
WITNESSES:
INVENTOR
Andrew H. Candee
BY
ATTORNEY

UNITED STATES PATENT OFFICE.

ANDREW H. CANDEE, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,354,167.  Specification of Letters Patent.  Patented Sept. 28, 1920.

Application filed August 3, 1917.  Serial No. 184,244.

*To all whom it may concern:*

Be it known that I, ANDREW H. CANDEE, a citizen of the United States, and a resident of Pittsburgh, in the county of Allegheny and State of Pennsylvania, have invented a new and useful Improvement in Control Systems, of which the following is a specification.

My invention relates to systems of control and particularly to systems of control for operating mining locomotives.

One object of my invention is to provide a system of control embodying a plurality of controllers, which are located in various positions relative to each other, that shall be interlocked in a manner to prevent injurious simultaneous operation thereof.

Another object of my invention is to provide a control system of the above indicated character that shall have two controllers for governing the operation of the motor or motors contained therein, and electrically controlled locking means for preventing the operation of the controllers under predetermined conditions.

Another object of my invention is to provide a control system that shall embody a main controller for governing the acceleration of the motors contained in the system, an auxiliary controller for governing the direction of rotation of the motors and the circuit relation of the motors relative to each other, and electrically operated means associated with the two controllers for preventing movement of the main controller under predetermined conditions.

More specifically, my invention embodies a control system having a plurality of motors, a main controller for governing the acceleration of the motors, an auxiliary controller located remote from the main controller for connecting the motors in series and in parallel-circuit relation and for governing the direction of rotation of the motors, and a master reverser disposed adjacent to and mechanically interlocked with the main controller and adapted to control an electrical-interlocking system between the main controller and the auxiliary controller in order to prevent the operation of the main controller until the auxiliary controller is moved to a position determined by the master reverser.

In many control systems, and particularly in control systems for mining locomotives, it is inconvenient and, in many cases, impossible to locate the various controllers in close proximity to each other and in such case, it is necessary to utilize complicated and cumbersome mechanical interlocking means for interlocking the various controllers.

In a system constructed in accordance with my invention, the various controllers are interlocked by electrically controlled means in order that they may be located in any convenient relation relative to each other.

In the accompanying drawing, Figure 1 is a diagrammatic view of a control system constructed in accordance with my invention and Fig. 2 is a plan view of the main controller and the master reverser illustrated in Fig. 1 of the drawing.

Referring to the accompanying drawing, two motors 1 and 2, respectively embodying armatures A1 and A2 and field windings F1 and F2 are adapted to be connected in series with resistors R1 to R6, inclusive, across a supply circuit, embodying a trolley conductor 3 and a ground return conductor 4 by means of a main controller 5 and an auxiliary controller 6. The main controller 5 embodies a contact segment 7 which is adapted to engage contact fingers 8 to 15, inclusive, in positions $a$ to $g$, inclusive, for short circuiting the resistors R1 to R6, inclusive.

The auxiliary controller 6 embodies an interlocking drum 16 and a reversing drum 17$^a$. The reversing drum 17$^a$ embodies a plurality of contact segments 17 to 26, inclusive, which are adapted to engage contact fingers 27 to 36, inclusive, when the controller is moved to positions $a$ and $b$ which respectively correspond to the forward series and the forward parallel positions of the motors. A plurality of contact segments 37 to 43, inclusive, are provided for engaging the contact fingers 27 to 36, inclusive, when the auxiliary controller is moved to positions $c$ and $d$, which respectively correspond to the reverse series and the reverse parallel positions of the motors.

The interlock drum 16 of the auxiliary controller 6 embodies a contact segment 44 which is adapted to engage contact fingers 45 to 49, inclusive, and to coöperate with a master reverser 50 for governing the energization of a coil 51, when moved through positions $a$, $b$, $c$ and $d$. The coil 51 is adapted to operate an interlocking means 52 for the main controller 5, as will be set forth later. A plurality of interlocking means 53 to 56, inclusive, are provided for coöperating with a recess 57 in the auxiliary controller 6 in order to hold the latter in its various operative positions under predetermined conditions. The interlocking means 53 to 56, inclusive, respectively embody plungers 58 to 61, inclusive, which are operated in one direction to enter the recess 57 by the springs 62 and are operated in a reverse direction by means of coils 63 to 66, inclusive. The master reverser 50 embodies a contact segment 67 which is adapted to engage contact fingers 68 to 72, inclusive, when moved through positions $a$, $b$, $c$ and $d$.

Referring to Fig. 2 of the drawing, the main controller 5 is mechanically interlocked with the master reverser 50 by means of an interlock 73. The interlock 73 embodies a plunger 74, which coöperates with a cam ring 75 of the main controller 5 and with recesses 76 which are formed in a ring 77 of the master reverser 50. In the "off" position of the main controller 5, the plunger 74 is projected into a recess 78 of the cam ring 75 by means of a spring 79 in order to permit free movement of the master reverser 50 but in any other position of the main controller, the plunger 74 is projected by means of the cam ring 75 into one of the recesses 76 of the ring 77 in order to prevent movement of the master reverser while the main controller is in an operative position. The locking means 52 embodies a plunger 80 which coöperates with a ring 81 of the main controller having a recess 82 therein and is operated in one direction by the coil 51 and in the opposite direction by a spring 83.

Assuming the main controller 5 to be in position $a$ and the auxiliary controller to be in position $a$, which is the forward series position, a circuit is completed from the trolley conductor 3 through the contact fingers 8 and 9—which are bridged by the contact segment 7—resistors R1 to R6, inclusive, armature A1, contact fingers 29 and 30—which are bridged by the contact segment 20—field windings F1, contact fingers 28 and 31—which are bridged by the contact segment 18—armature A2, contact fingers 34 and 35—which are bridged by the contact segment 25—field winding F2 and contact fingers 32 and 33—which are bridged by the contact segment 23—to the ground return conductor 4. The motors are connected in series relation for operation in a forward direction and may be accelerated by moving the main controller through positions $a$ to $g$, inclusive, in order to short circuit the resistors R1 to R6, inclusive.

In case it is desired to operate the motors 1 and 2 in parallel-circuit relation and in a forward direction, the main controller 5 is moved to position $a$ and the auxiliary controller 6 is moved to position $b$ which is its forward parallel position. A circuit is completed from the trolley conductor 3 through the contact fingers 8 and 9—which are bridged by the contact segment 7—resistors R1 to R6, inclusive, where the circuit divides, one branch extending through the armature A1, contact fingers 29 and 30—which are bridged by the contact segment 19—field winding F1, contact finger 31 and contact segments 21 and 26 to the ground return conductor 4, and the second branch extending through contact fingers 27 and 28—which are bridged by the contact segment 17—armature A2, contact fingers 34 and 35—which are bridged by the contact segment 24—field winding F2 and the contact fingers 32 and 33—which are bridged by the contact segment 22—to the ground return conductor 4. The motors 1 and 2 are connected in parallel circuit relation and may be further accelerated by moving the main controller 5 to short circuit the resistors R1 to R6, inclusive.

In position $c$ of the auxiliary controller 6, the motors 1 and 2 are connected in series-circuit relation for operation in a reverse direction and, in position $d$ of the auxiliary controller, the motors 1 and 2 are connected in parallel-circuit relation for operation in a reverse direction. The circuits formed through the motors 1 and 2 in positions $c$ and $d$ of the auxiliary controller differ from the circuit formed through the motors 1 and 2 in positions $a$ and $b$ of the auxiliary controller only in the position of the field windings F1 and F2 relative to the armatures A1 and A2 and, accordingly, it is deemed unnecessary to completely trace the circuits through the motors when the auxiliary controller is in position $c$ or in position $d$.

Assuming the main controller 5 to be in the "off" position, the mechanical interlocking means 73 will permit the free movement of the master reverser 50, and the auxiliary controller 6 may be moved to any of the operative positions for operating the motors in series and in parallel circuit relation and in a forward and in a reverse direction. In case the master reverser 50 is moved to position $a$ and the auxiliary controller 6 is in the "off" position, it will be noted that the interlocking means 52 will be operated to prevent any movement of the main controller 5 from the "off" position until the auxiliary controller 6 has been moved to position $a$. When the master reverser 50 is in position $a$, a circuit is completed from one terminal of the battery B through the coil 51 of the interlocking means 52 which may be traced through the contact fingers 68 and 70—which are bridged by the contact segment 67—contact fingers 46 and 49—which are bridged by the contact segment 44—and the coil 51 to the other terminal of the battery B. Moreover, parallel circuits are completed through the operating coils 63, 64 and 65 of the interlocking means 53, 54 and 55 in order to hold the plungers 58, 59 and 60 from entering the recess 57 when the controller is moved through positions b, c and d. It will be noted that the coil 66 of the lock 56 is deënergized and that the plunger 61 is moved by its associated spring 62 into the recess 57 when the auxiliary controller is moved to position a. In moving the auxiliary controller 6 from the "off" position to position a, it will be noted that the circuit of the coil 51 is completed through the contact finger 46 and the contact segment 44 in the "off" position of the controller, and that in position a of the auxiliary controller the coil 51 of the auxiliary switch is deënergized by reason of the contact finger 46 being disengaged from the contact segment 44.

In case the master reverser 50 is moved to position b, the interlocking means 55 will operate to hold the auxiliary controller 6 in position b until further movement of the master reverser, and in positions c and d of the master reverser, the interlocking means 53 and 54 will operate to maintain the auxiliary controller 6 in positions corresponding thereto.

From the above description, it will be noted that the mechanical interlock 73 serves to prevent movement of the master reverser 50 when the main controller 5 is in an operative position. The interlock 52, which is associated with the interlock drum 16 of the auxiliary controller 6 and the master reverser 50, serves to prevent movement of the main controller 5 until the auxiliary controller 6 is in a position corresponding to the position of the master reverser 50. The interlocks 53 to 56, inclusive, which are associated with the auxiliary controller 6, serve to lock the auxiliary controller in a position corresponding to the position of the master reverser when moved thereto.

Modifications in the system and arrangement and location of parts may be made within the spirit and scope of my invention and such modifications are intended to be covered by the appended claims.

I claim as my invention:

1. In a system of control, the combination with a plurality of motors, a main controller for governing the acceleration of the motors in various circuit relations, and an auxiliary controller for operating the motors in a forward and in a reverse direction and in series and in parallel relation, of a master reverser disposed adjacent to the main controller and remote to the auxiliary controller, means for preventing the operation of the master reverser when the main controller is in an operative position, and means for preventing the operation of the main controller until the auxiliary controller is in a position corresponding to the position of the master reverser.

2. In a system of control, the combination with a plurality of motors, a main controller for governing the acceleration of the motors, an auxiliary controller for operating the motors in series and in parallel circuit relation and in a forward and in a reverse direction, of a master reverser, means for preventing movement of the master reverser when the main controller is in an operative position, and means for holding the main controller in the "off" position until the master reverser and the auxiliary controller occupy corresponding positions and for holding the auxiliary controller in a position corresponding to the position of the master reverser until the position of the master reverser is changed.

3. In a system of control, the combination with a plurality of rotatable control drums, of plural locking means corresponding to different positions of one drum and operative in a direction transverse to the rotative movement thereof, said means being successively governed by another drum.

4. In a system of control, the combination with a plurality of rotatable control drums, of plural means biased to lockingly engage the end surface of one drum in different positions thereof, said means being successively electrically released by another drum.

5. In a system of control, the combination with a plurality of plural-position control drums, of means respectively corresponding to the positions of one drum and biased to engage that drum in an axial direction, said means being successively governed by another drum to hold said one drum in a position corresponding to the position of said other drum.

In testimony whereof, I have hereunto subscribed my name this 17th day of July 1917.

ANDREW H. CANDEE.